T. E. MURRAY & H. R. WOODROW.
ELECTRICAL WELDING.
APPLICATION FILED DEC. 10, 1915.

1,172,301.  Patented Feb. 22, 1916.

Inventors
Thomas E. Murray
Harry R. Woodrow
By their Attorney

UNITED STATES PATENT OFFICE.

THOMAS E. MURRAY AND HARRY R. WOODROW, OF NEW YORK, N. Y.; SAID WOODROW ASSIGNOR TO SAID MURRAY.

ELECTRICAL WELDING.

1,172,301.  Specification of Letters Patent.  Patented Feb. 22, 1916.

Application filed December 10, 1915. Serial No. 66,042.

*To all whom it may concern:*

Be it known that we, THOMAS E. MURRAY and HARRY R. WOODROW, citizens of the United States, residing at New York, in the county of New York and State of New York, have invented a certain new and useful Improvement in Electrical Welding, of which the following is a specification.

The invention is an electrical welding machine for making lap welds, and consists in the arrangement of the roller electrodes, constructed respectively to make contact with the overlapping body and the overlapped body and to move over the surfaces of said bodies, which at the same time may be subjected to mechanical pressure.

Figure 1:
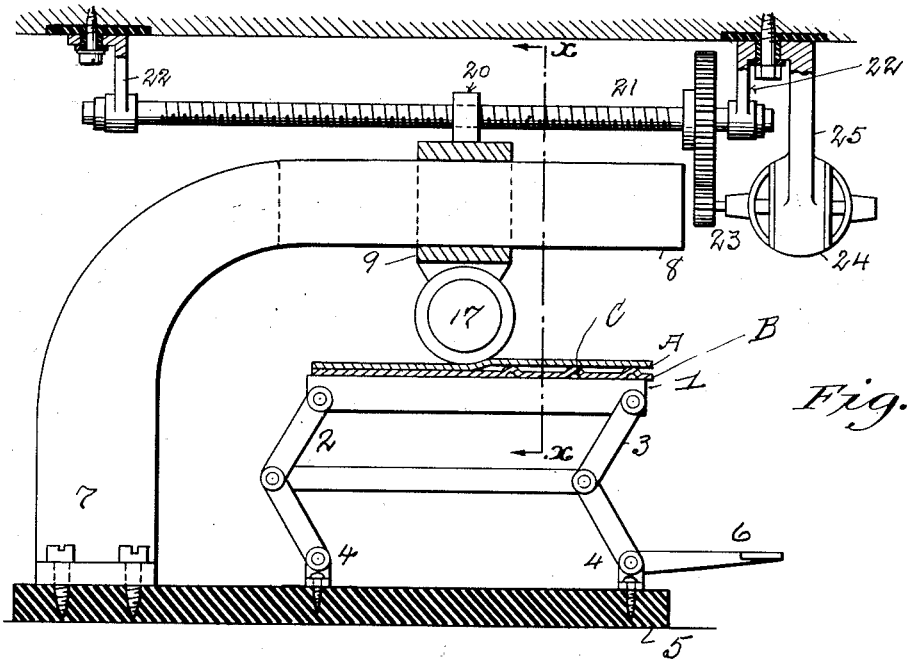
Figures 2, 3:
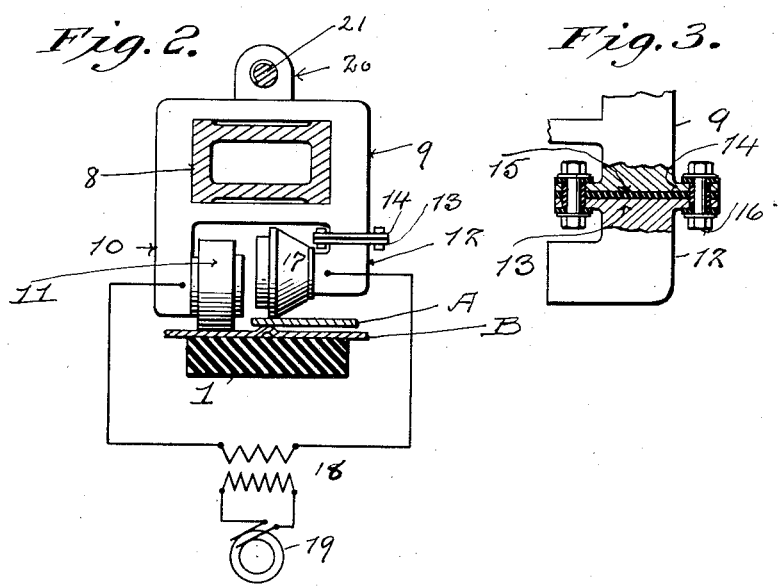

In the accompanying drawings—Figure 1 is a side elevation of our welding machine. Fig. 2 is a cross section on the line $x$—$x$ of Fig. 1. Fig. 3 is an enlarged sectional view of the insulated joint between frame 9 and arm 12, Fig. 2.

Similar numbers and letters of reference indicate like parts.

1 is a table of refractory insulating material supported by linked toggles 2, 3 pivoted on each side of said table and in lugs 4 on the insulating base 5. The lower members of toggle 3 are fast on a rock shaft which carries a treadle 6, by means of which the toggles can be straightened and the table 1 raised.

On base 5 is a standard 7 which has a horizontal guide-bar 8. A sliding frame 9, through which said bar passes, has a downwardly depending arm 10, on the inner side of which is pivoted a roller 11. A second arm 12, made separately, has a flange 13 at its upper end which registers with a flange 14 on frame 9, as shown in Fig. 3. Between flanges 13 and 14 is a plate 15 of insulating material. Bolts 16, provided with insulating bushings, unite flanges 13 and 14. On the arm 12, which is inwardly turned, is pivoted a roller 17, having a narrow circumferential edge. The central axes of the rollers 11 and 17 are not in the same plane, the axis of roller 11 being above the axis of roller 17. The two rollers 11 and 17 are the welding electrodes, and may be connected in any suitable way to the usual transformer 18, supplied by generator 19.

The sliding frame 9 has on its upper side a nut 20, through which passes the screw 21, supported in insulated hangers 22. Said screw is rotated, through gearing 23, by motor 24, supported on hanger 25.

A and B are the two plates to be lap welded together, the lower plate B having a series of projections C on its upper side. The plate A laps over the plate B and covers said projections. The roller 17 when caused to travel by screw 21, runs along the upper plate A directly over said projections. The roller 11 bears upon the uncovered portion of plate B, and is moved thereon coincidently with roller 17. The welding current then passes from one roller electrode through the plates A, B to the other roller electrode, and forms spot welds between the two plates at the projections C. At the same time, through the toggles and treadle the table is lifted so as to exert strong mechanical pressure upon the plates A, B. By this construction, we are enabled to keep both electrodes on the same side of the plates to be united, and to obviate the use of an electrode supporting the lower plate. This is of advantage in lap welding, and restricts the current path between the electrodes to a very small distance.

We claim:

1. An electrical welding machine, comprising an insulated table upon which the bodies to be welded are superposed, one body lapping over a portion of the other body, a support movable in the direction of the edge of said overlapping body and having two depending arms differing in length, and roller electrodes carried by said arms; one of said electrodes bearing upon the overlapped body, and the other upon the overlapping body.

2. An electrical welding machine, comprising an insulated table upon which the bodies to be welded are superposed, one body lapping over a portion of the other body, a support movable in the direction of the edge of said overlapping body and having two depending arms differing in length, roller electrodes carried by said arms, and means for varying the pressure between said bodies and said roller electrodes.

In testimony whereof we have affixed our signatures in presence of two witnesses.

THOMAS E. MURRAY.
HARRY R. WOODROW.

Witnesses:
GERTRUDE T. PORTER,
MAY T. McGARRY.